(12) United States Patent
Ando

(10) Patent No.: US 11,565,428 B2
(45) Date of Patent: Jan. 31, 2023

(54) GRIPPING MECHANISM AND ASSEMBLY APPARATUS

(71) Applicant: KYOCERA Document Solutions Inc., Osaka (JP)

(72) Inventor: Satoshi Ando, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 35 days.

(21) Appl. No.: 17/432,079

(22) PCT Filed: Dec. 16, 2019

(86) PCT No.: PCT/JP2019/049181
§ 371 (c)(1),
(2) Date: Aug. 18, 2021

(87) PCT Pub. No.: WO2020/174821
PCT Pub. Date: Sep. 3, 2020

(65) Prior Publication Data
US 2022/0152841 A1     May 19, 2022

(30) Foreign Application Priority Data
Feb. 25, 2019   (JP) .............................. JP2019-032021

(51) Int. Cl.
     *B25J 15/00*          (2006.01)
     *B23P 19/04*          (2006.01)
     *B23P 19/00*          (2006.01)

(52) U.S. Cl.
CPC ........... *B25J 15/0028* (2013.01); *B23P 19/04* (2013.01); *B25J 15/0038* (2013.01); *B23P 19/007* (2013.01)

(58) Field of Classification Search
CPC .... B25J 15/0038; B25J 15/00; B25J 15/0028; B25J 15/0033; B25J 11/005; B42F 15/066; B25B 5/00; B25B 5/16–163; B23P 19/007; B23P 19/04
See application file for complete search history.

(56) References Cited

U.S. PATENT DOCUMENTS

| 1,417,009 | A | * | 5/1922 | Woodward | ........... | A47G 25/487 |
|---|---|---|---|---|---|---|
| | | | | | | 24/DIG. 8 |
| 3,298,647 | A | * | 1/1967 | Shepard | .............. | B65B 67/1227 |
| | | | | | | 248/101 |

(Continued)

FOREIGN PATENT DOCUMENTS

JP        H07-241733 A     9/1995

*Primary Examiner* — Matthew P Travers
(74) *Attorney, Agent, or Firm* — Studebaker & Brackett PC

(57) ABSTRACT

A gripping mechanism (3) includes a holder (31), a gripping roller (32), a first movable plate (331), a second movable plate (332), a first spring (341), and a second spring (342). The holder (31) houses the gripping roller (32). The first movable plate (331) and the second movable plate (332) pinch the gripping roller (32) inside the holder (31). The first spring (341) urges the first movable plate (331) toward the gripping roller (32). The second spring (342) urges the second movable plate (332) toward the gripping roller (32). The gripping mechanism (3) grips a gripped section (42) of a first component (4) between the first movable plate (331) and the gripping roller (32).

6 Claims, 7 Drawing Sheets

(56) References Cited

U.S. PATENT DOCUMENTS

| | | | | |
|---|---|---|---|---|
| 3,780,923 | A | * | 12/1973 | Merola .................. B65G 15/00 74/25 |
| 3,813,090 | A | * | 5/1974 | Merola .................. B23Q 7/043 24/134 P |
| 4,085,848 | A | * | 4/1978 | Tsuge ................... B42F 15/066 211/89.01 |
| 4,831,693 | A | * | 5/1989 | Veith .................... B42F 15/066 294/102.1 |
| 5,152,490 | A | * | 10/1992 | Deutsch ................ A47B 97/04 248/452 |
| 6,182,936 | B1 | * | 2/2001 | Yang .................... B42F 15/066 400/718 |
| 7,373,748 | B2 | * | 5/2008 | Pitcher ................ G09F 15/0018 40/658 |
| 2020/0164524 | A1 | * | 5/2020 | Yamakawa .......... B25J 15/0038 |

* cited by examiner

GRIPPING MECHANISM AND ASSEMBLY APPARATUS

TECHNICAL FIELD

The present invention relates to a gripping mechanism and an assembly apparatus.

BACKGROUND ART

An assembly apparatus described in Patent Literature 1 includes a chuck mechanism which grips a component to be conveyed. The chuck mechanism is an electric gripping mechanism. Other gripping mechanisms are known which use air suction or electric suction.

CITATION LIST

Patent Literature

[Patent Literature 1]
Japanese Patent Application Laid-Open Publication No. H07-241733

SUMMARY OF INVENTION

Technical Problem

A conventional gripping mechanism uses power such as air pressure or electrical energy and is therefore expensive and easily broken.

The present invention takes the above matter into account and an objective thereof is to provide a gripping mechanism that is low in cost and difficult to break, and an assembly apparatus which includes the gripping mechanism.

Solution to Problem

A gripping mechanism of the present invention includes a roller, a frame, a first movable plate, a second movable plate, a first elastic object, and a second elastic object. The frame houses the roller. The first movable plate and the second movable plate pinch the roller inside the frame. The first elastic object urges the first movable plate toward the roller. The second elastic object urges the second movable plate toward the roller. The gripping mechanism grips an object between the first movable plate and the roller.

An assembly apparatus according to the present invention includes the above gripping mechanism and a driving mechanism which moves the gripping mechanism relative to the object.

Advantageous Effects of Invention

According to the present invention, a gripping mechanism that is low in cost and difficult to break, and an assembly apparatus which includes the gripping mechanism can be provided. Moreover, an object can be gripped between the first movable plate and the roller even if the position of the object is somewhat offset relative to the gripping mechanism.

DESCRIPTION OF EMBODIMENTS

Figure 1:
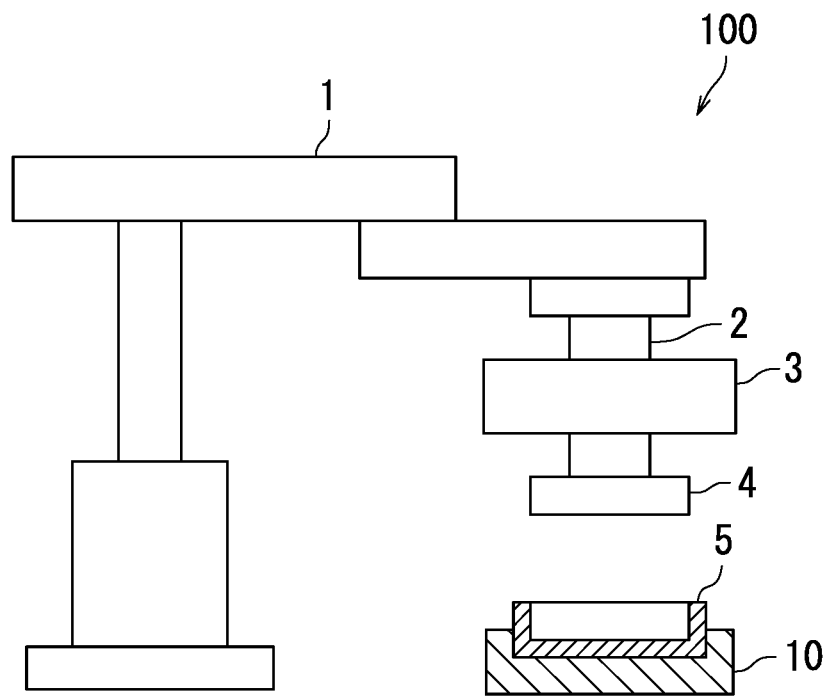
FIG. 1 is a diagram illustrating an example of an assembly apparatus according to an embodiment of the present invention.
Figure 1:
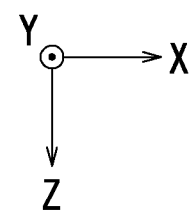
Figure 2:
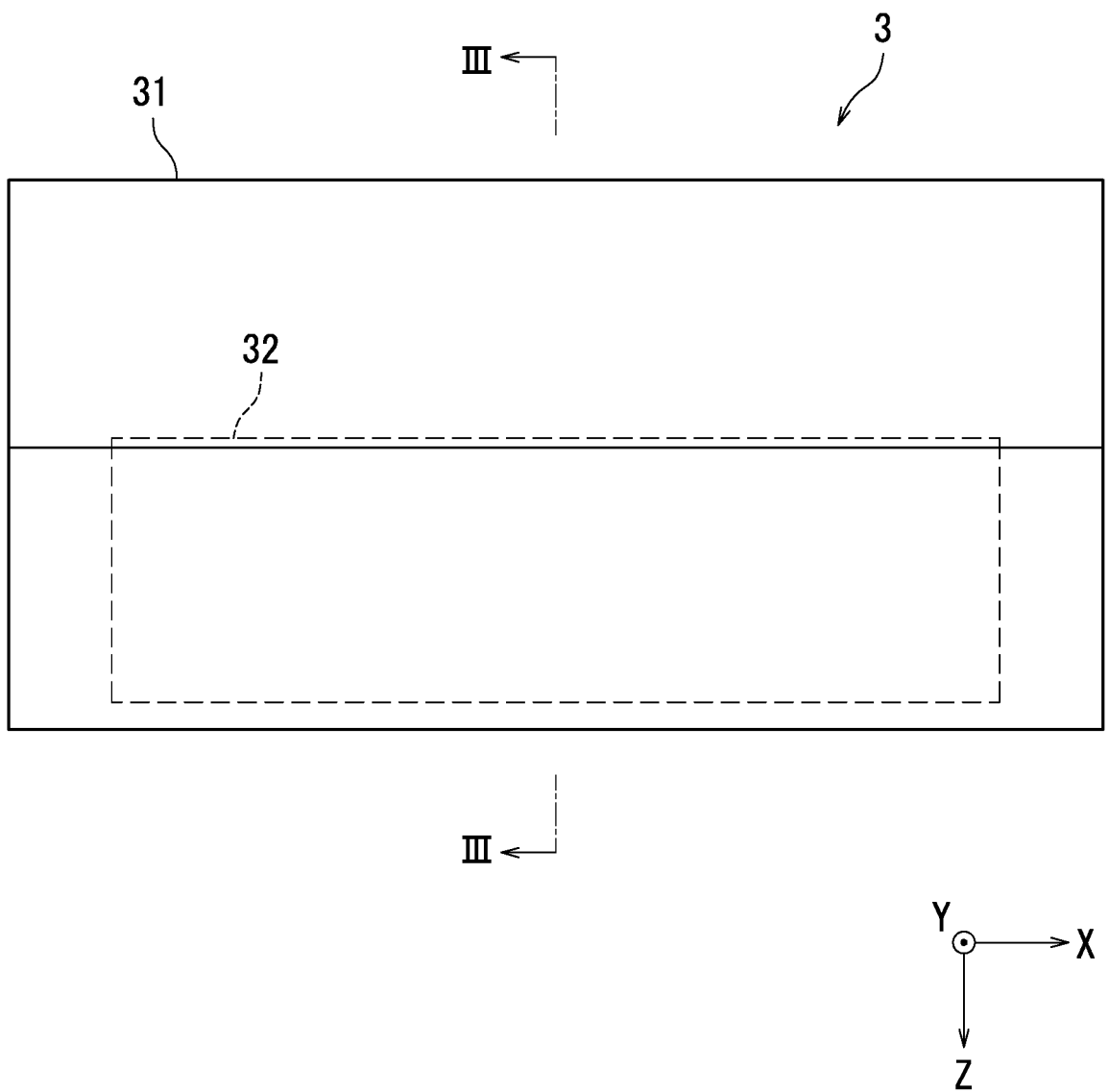
FIG. 2 is a front view of an example of a gripping mechanism according to the embodiment of the present invention.

The following describes an embodiment of the present invention with reference to FIGS. 1 to 6. In FIGS. 1 and 2, as a matter of convenience, a direction from the left to the right is referred to as a positive X axial direction, a direction from the back to the front is referred to as a positive Y axial direction, and a direction from up to down is referred to as a positive Z axial direction. Elements which are the same or equivalent are labeled with the same reference signs in the drawings and description thereof is not repeated.

First, an assembly apparatus 100 according to the embodiment is described with reference to FIG. 1. FIG. 1 is a diagram illustrating an example of the assembly apparatus 100 according to the embodiment.

As illustrated in FIG. 1, the assembly apparatus 100 is an apparatus which assembles by fitting a first component 4 to a second component 5. The assembly apparatus 100 includes a robot 1, a position correcting device 2, and a gripping mechanism 3.

The gripping mechanism 3 grips the first component 4. The second component 5 is positioned on a position determining mechanism 10.

The position correcting device 2 corrects, relative to the second component 5, positional shift of the first component 4 gripped by the gripping mechanism 3. Specifically, the position correcting device 2 detects the direction of motive force of the first component 4 during fitting of the first component 4 to the second component 5 and corrects a positional shift of the first component 4 according to the direction of the force.

The robot 1 moves the gripping mechanism 3 relative to the first component 4 and moves the gripping mechanism 3 relative to the second component 5. Specifically, the robot 1 moves the gripping mechanism 3 to a storage location of the first component 4, grips the first component 4 with the gripping mechanism 3, and then moves the first component 4 together with the gripping mechanism 3 to a point directly above the second component 5. Thereafter, the robot 1 fits the first component 4 to the second component 5 by moving the first component 4 together with the gripping mechanism 3 in the positive Z axial direction. After the fitting has been achieved, the robot 1 causes the gripping mechanism 3 to release the first component 4 and moves the gripping mechanism 3 in the negative Z axial direction. The robot 1 corresponds to an example of a "driving mechanism".

Figure 3:
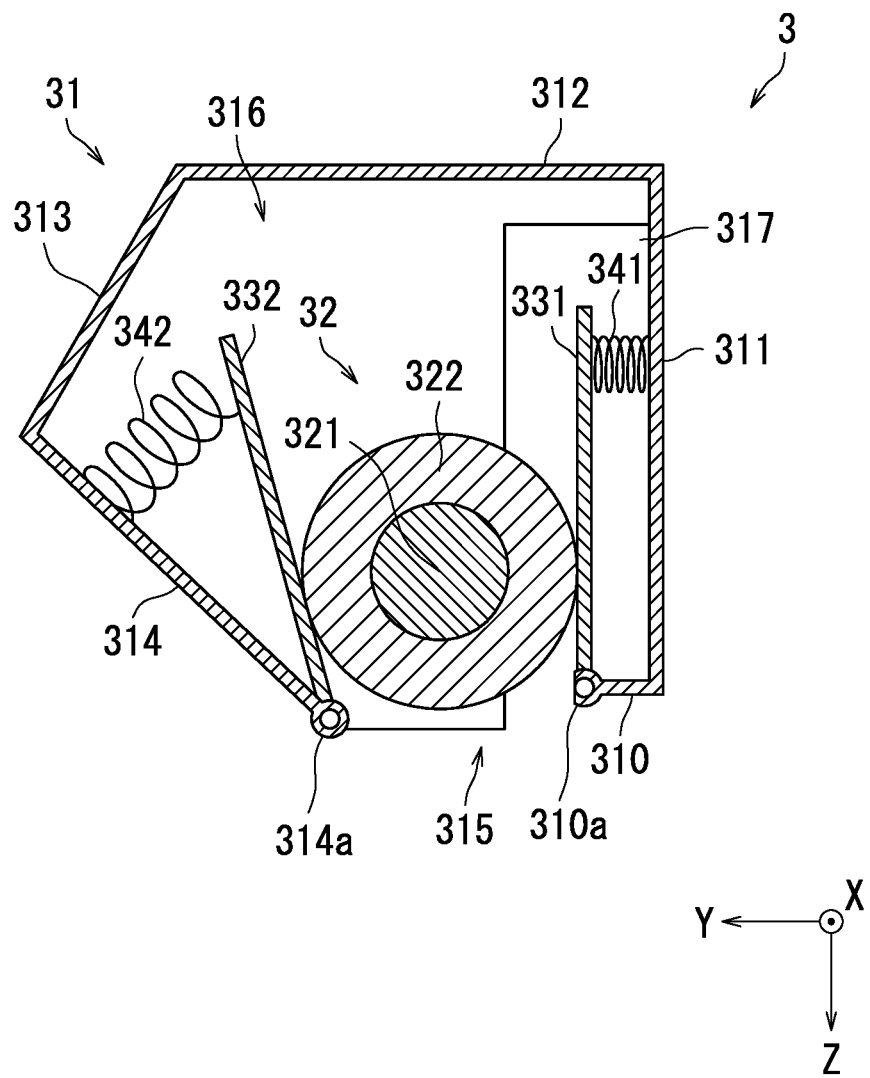
FIG. 3 is a cross-sectional view taken along a line in FIG. 2.

Next, the gripping mechanism 3 according to the embodiment is described with reference to FIGS. 2 and 3. FIG. 2 is a front view of an example of the gripping mechanism 3 according to the embodiment. FIG. 3 is a cross-sectional view taken along a line in FIG. 2.

As illustrated in FIG. 2, the gripping mechanism 3 includes a holder 31 and a gripping roller 32. The longitudinal direction of the holder 31 and the longitudinal direction of the gripping roller 32 are both the X axial direction. The holder 31 corresponds to an example of a "frame". The gripping roller 32 corresponds to an example of a "roller".

As illustrated in FIG. 3, the gripping roller 32 has a cylindrical core 321 and a covering section 322 which covers the peripheral surface of the core 321. For example, the core 321 is made from a metal such as iron, and the covering section 322 is made from an elastic object such as polyacetal resin. The density of the core 321 is greater than the density of the covering section 322. The covering section 322 can be compressed and deformed. The friction coefficient of the peripheral surface of the covering section 322 is greater than the friction coefficient of the peripheral surface of the core 321.

As illustrated in FIG. 3, the holder 31 is a frame which houses the gripping roller 32, and includes a bottom plate 310, a back plate 311, a top plate 312, an upper front plate 313, a lower front plate 314, and left and right side plates 316. The holder 31 is made from a light metal such as aluminum, for example.

The bottom plate 310 is a rectangular plate extending along an XY plane. The back plate 311 is a rectangular plate extending along a ZX plane starting from the back edge of the bottom plate 310. The top plate 312 is a rectangular plate extending along an XY plane starting from the upper edge of the back plate 311. The upper front plate 313 is a rectangular plate extending diagonally downward in a direction away from the back plate 311 starting from the front edge of the top plate 312. The lower front plate 314 is a rectangular plate extending diagonally downward in a direction approaching the back plate 311 starting from the lower edge of the upper front plate 313.

An opening 315 is formed between the front edge of the bottom plate 310 and the lower edge of the lower front plate 314.

As illustrated in FIG. 3, the gripping mechanism 3 further includes a first movable plate 331, a second movable plate 332, a first spring 341, and a second spring 342. The first movable plate 331 and the second movable plate 332 are also made from a light metal such as aluminum, for example.

The first movable plate 331 is a rectangular plate extending into the holder 31 starting from the front edge of the bottom plate 310. In a periphery of the opening 315, the first movable plate 331 is pivotably supported on the front edge of the bottom plate 310 through a first hinge 310a.

The second movable plate 332 is a rectangular plate extending into the holder 31 starting from the lower edge of the lower front plate 314. In a periphery of the opening 315, the second movable plate 332 is pivotably supported on the lower edge of the lower front plate 314 through a second hinge 314a.

The first movable plate 331 and the second movable plate 332 pinch the gripping roller 32 inside the holder 31. The first spring 341 urges the first movable plate 331 toward the gripping roller 32. The second spring 342 urges the second movable plate 332 toward the gripping roller 32. The second spring 342 is stronger than the first spring 341. That is, the spring constant of the second spring 342 is greater than the spring constant of the first spring 341. The first spring 341 corresponds to an example of a "first elastic object", and the second spring 342 corresponds to an example of a "second elastic object".

FIG. 3 illustrates an initial state of the gripping mechanism 3. The weight of the gripping roller 32 and the spring constants of the first and second springs 341 and 342 are preadjusted such that the first movable plate 331 extends nearly parallel to the back plate 311 in the initial state.

The width of the opening 315 in the Y axial direction is shorter than the diameter of the gripping roller 32. Accordingly, the gripping roller 32 does not fall through the opening 315. The first and second movable plates 331 and 332 hold the weight of the gripping roller 32. The opening 315 can receive insertion of an object to be gripped.

The bottom plate 310, the back plate 311, the top plate 312, the upper front plate 313, and the lower front plate 314 form substantially pentagonal openings on the left and right sides of the holder 31. Left and right side plates 316 are installed so as to cover the openings. However, at least one of the side plates 316 has a cutout portion 317 near the back plate 311. The cutout portion 317 allows passage of the object to be gripped but not passage of the gripping roller 32 when gripping is released.

By configuring a side plate 316 to be freely openable and closable for example, it is possible to insert and remove the gripping roller 32.

Figure 4:
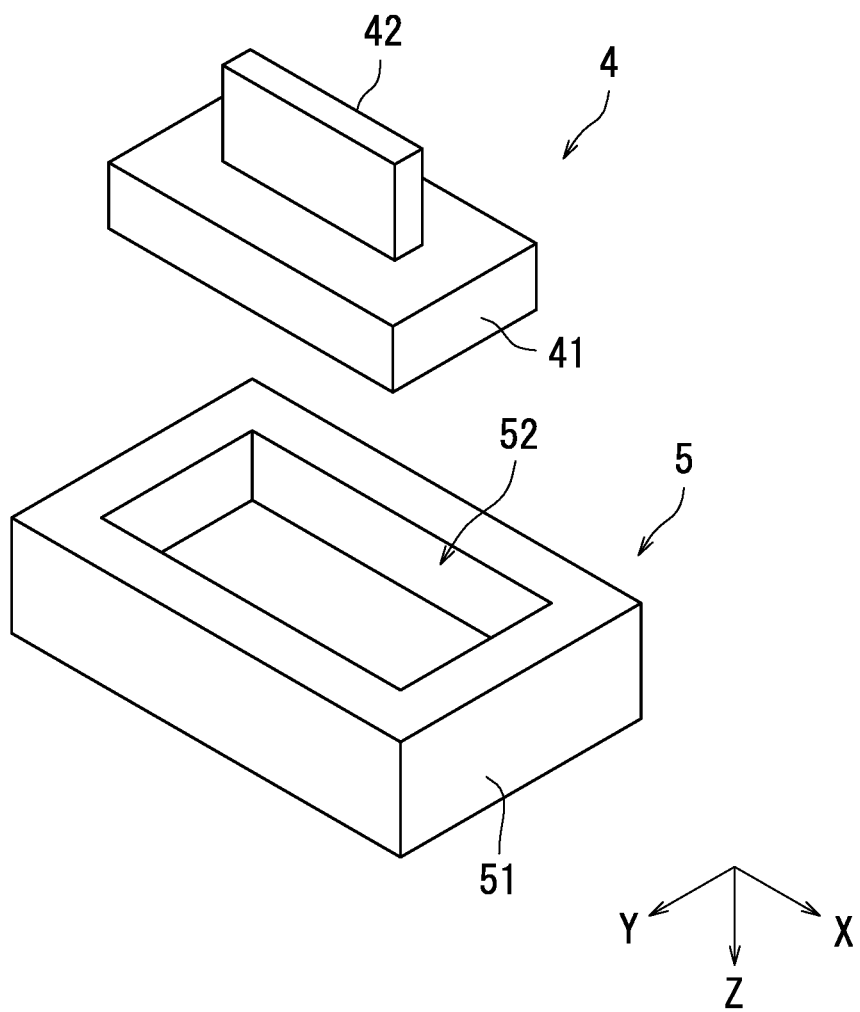
FIG. 4 is a perspective view of an example of a first component and a second component.

Next, the first component 4 and the second component 5 are described with reference to FIG. 4. FIG. 4 is a perspective view of an example of the first component 4 and the second component 5.

As illustrated in FIG. 4, the first component 4 includes a component main body 41 and a gripped section 42. The component main body 41 is substantially rectangular parallelepiped-shaped. The gripped section 42 protrudes from the component main body 41 so as to be easily gripped by the gripping mechanism 3. The gripped section 42 is formed in a rectangular plate shape and an edge of the gripped section 42 is connected to one main surface of the component main body 41.

The second component 5 is formed with a recess 52 in a substantially rectangular parallelepiped-shaped component main body 51. The recess 52 receives insertion of the component main body 41 of the first component 4.

Figure 5:
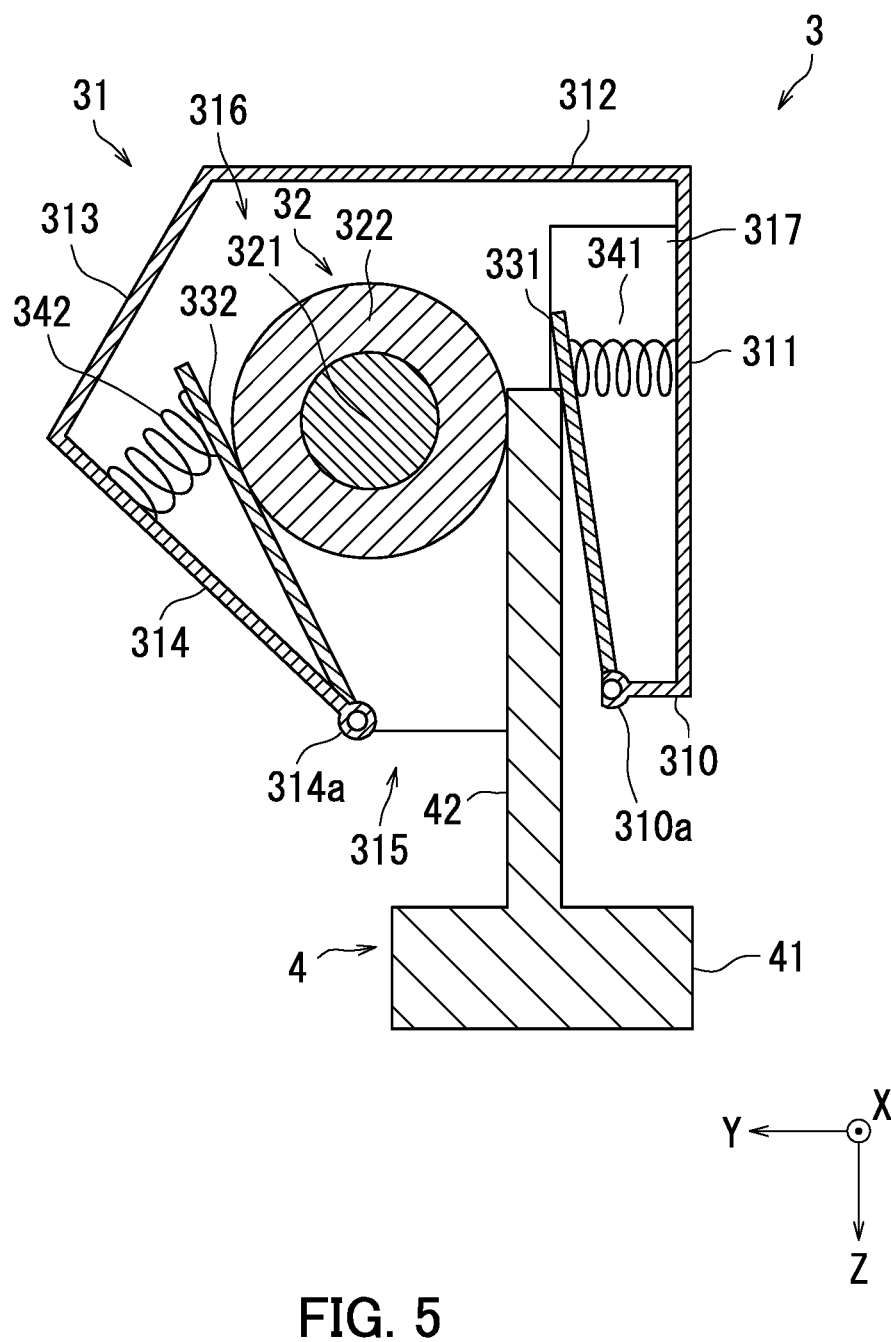
FIG. 5 is a cross-sectional view for describing operation of the gripping mechanism.
Figure 6:
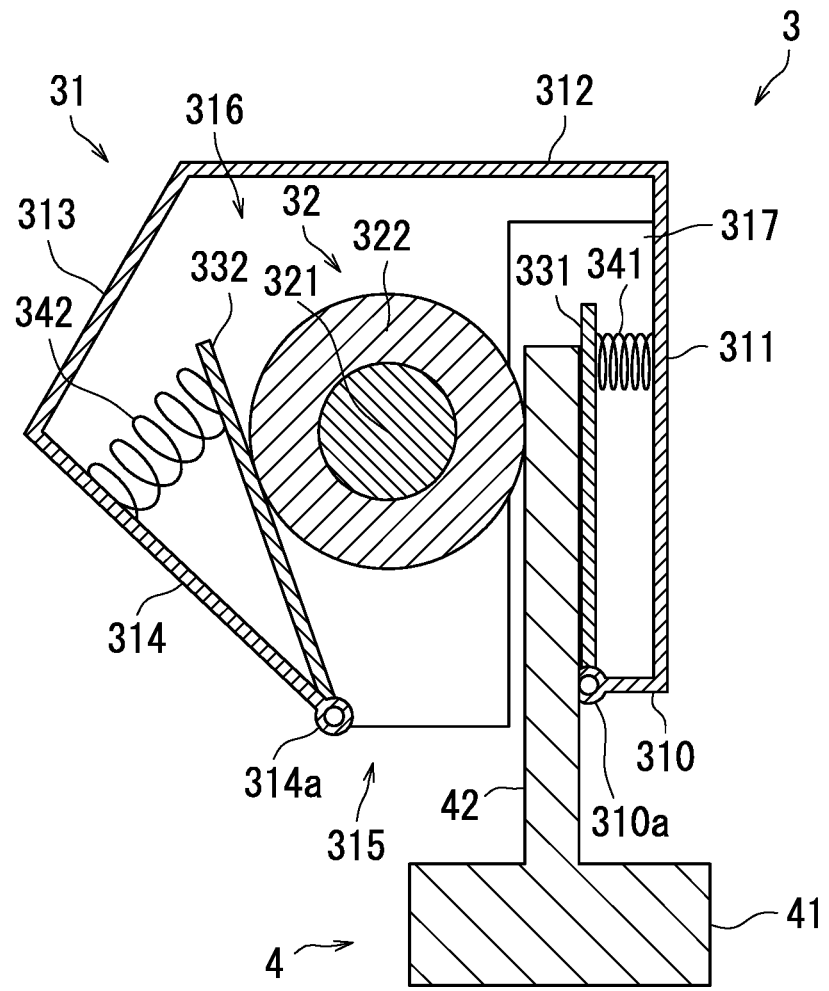
FIG. 6 is a cross-sectional view for describing operation of the gripping mechanism.
Figure 6:
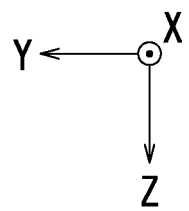

Next, the operation of the gripping mechanism 3 is described with reference to FIGS. 5 and 6. FIGS. 5 and 6 are cross-sectional views for describing the operation of the gripping mechanism 3.

FIG. 5 illustrates a transitional state of the gripping mechanism 3. In FIG. 5, it is assumed that the gripped section 42 is not inserted into the opening 315 so as to be adjacent to the first movable plate 331 in the initial state illustrated in FIG. 3 but rather that the gripped section 42 is inserted into the opening 315 at a position away from the first movable plate 331. However, the insertion position of the gripped section 42 is a position closer to the first movable plate 331 than the center of the gripping roller 32 in the initial state. The first component 4 is restrained by an unillustrated external device so as not to move. In the transitional state, the first spring 341 is extended and the second spring 342 is compressed as compared to the initial state. The changes are according to the insertion position of the gripped section 42. The gripping mechanism 3 grips the gripped section 42 between the first movable plate 331 and the gripping roller 32 due to gravity acting on the gripping roller 32.

FIG. 6 illustrates a stationary state of the gripping mechanism 3. The restraint of the first component 4 by the unillustrated external device is released. Accordingly, the first movable plate 331, the second movable plate 332, the gripping roller 32, and the first component 4 are motionless in a position in which the first and second springs 341 and 342 are at equilibrium. In the stationary state, the first spring 341 is compressed and the second spring 342 is extended as compared to the transitional state. This is because the second spring 342 is stronger than the first spring 341. As a result, the gripping mechanism 3 grips the gripped section 42 between the first movable plate 331 and the gripping roller 32 also due to gravity acting on the gripping roller 32 in the stationary state. The second movable plate 332 is normally inclined relative to the Z axial direction (vertical direction) and holds the weight of the gripping roller 32.

Moreover, in the stationary state, the contact surface area of the first movable plate 331 and the gripped section 42 is large because the first movable plate 331 extends nearly parallel to the back plate 311. As a result, great gripping force can be obtained. Furthermore, due to compressive deformation of the covering section 322, the contact surface area of the gripping roller 32 and the gripped section 42 is greater than a case in which the covering section 322 is formed by an inelastic object. As a result, even greater gripping force can be obtained.

According to the present embodiment, the gripped section 42 is usually gripped between the first movable plate 331 and the gripping roller 32 in the same position in the stationary state even if the insertion position of the gripped section 42 in the transitional state differs from the insertion position illustrated in FIG. 5. Furthermore, the gripped section 42 is normally gripped between the first movable plate 331 and the gripping roller 32 in the same position in the stationary state even if the thickness of the gripped section 42 differs in the Y axial direction.

The following describes operation of the assembly apparatus 100 with reference to FIGS. 1 to 6.

In a first process, the robot 1 moves the gripping mechanism 3 to a storage location of the first component 4 as illustrated in FIG. 1. The robot 1 then adjusts the posture of the gripping mechanism 3 such that the gripped section 42 and the back plate 311 are parallel to each other and moves the gripping mechanism 3 in the positive Z axial direction relative to the first component 4. The gripped section 42 is inserted into the holder 31 through the opening 315 and rises inside the holder 31 while pushing aside the gripping roller 32 as illustrated in FIG. 5. When the upper edge of the gripped section 42 has reached a higher position than the center of the gripping roller 32, the movement of the gripping mechanism 3 stops. The gripped section 42 is gripped between the first movable plate 331 and the gripping roller 32.

In a second process, the robot 1 moves the gripping mechanism 3 in the negative Z axial direction. As a result, the restraint to the first component 4 is released and the stationary state of the gripping mechanism 3 illustrated in FIG. 6 is realized. The robot 1 conveys the first component 4 to a position directly above the second component 5 as illustrated in FIG. 1 by further moving the gripping mechanism 3. The gripped section 42 is left gripped between the first movable plate 331 and the gripping roller 32.

In a third process, the robot 1 moves the gripping mechanism 3 in the positive Z axial direction. As a result, the first component 4 is fitted to the second component 5. Note that in a case in which there is concern that the gripped section 42 will slip between the first movable plate 331 and the gripping roller 32 during fitting, an assistive means which presses the first component 4 in the positive Z axial direction may be added. In any case, the stationary state illustrated in FIG. 6 is maintained at least until just before fitting.

In a fourth process, the robot 1 moves the gripping mechanism 3 in the positive X axial direction. The gripped section 42 slides between the first movable plate 331 and the gripping roller 32, and further passes through the cutout portion 317. As a result, the gripping of the first component 4 by the gripping mechanism 3 is released. The first component 4 is left fitted to the second component 5.

In a fifth process, the robot 1 moves the gripping mechanism 3 in the negative Z axial direction and returns the gripping mechanism 3 to the original position thereof in preparation for the next operation.

Figure 7:
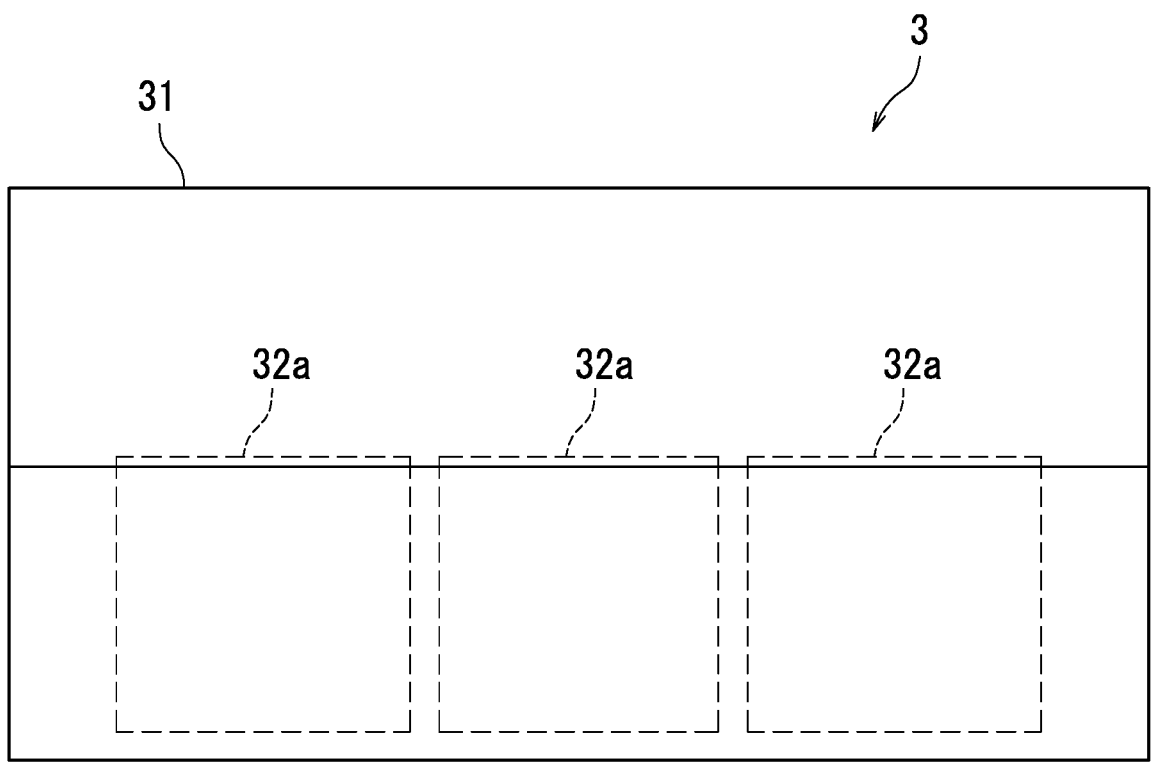
FIG. 7 is a front view of a variation of the gripping mechanism.

Next, a variation of the gripping mechanism 3 is described with reference to FIG. 7. FIG. 7 is a front view of the variation of the gripping mechanism 3.

The gripping mechanism 3 in FIG. 7 differs from the gripping mechanism 3 in FIG. 2 in that there is a plurality of gripping rollers 32a housed in the holder 31. By making the weights of the gripping rollers 32a different from each other, a plurality of gripping forces can be appropriately used. Furthermore, the friction coefficients of the peripheral surfaces of the gripping rollers 32a may be differentiated from each other.

At least one set of a first movable plate 331, a second movable plate 332, a first spring 341, and a second spring 342 is provided for the gripping rollers 32a.

According to the embodiment as illustrated in FIGS. 2 and 7, a gripping mechanism 3 which does not require power can be configured by using one gripping roller 32 or a plurality of gripping rollers 32a. As a result, the gripping mechanism 3 is realized that is low cost and is difficult to damage. Moreover, the gripped section 42 is gripped between the first movable plate 331 and the gripping roller 32 as illustrated in FIGS. 5 and 6 even if the position of the gripped section 42 is somewhat offset relative to the gripping mechanism 3.

The description of the above embodiment is of an ideal embodiment of the present invention, and therefore includes various favorable technical limitations. However, the technical scope of the present invention is not limited to the embodiment unless specifically described as such. That is, elements of configuration in the above embodiment may be appropriately replaced with existing elements of configuration and the like, and a number of variations including other existing elements of configuration are possible. The description of the above embodiment does not limit the content of the invention described in the claims.

(1) In the embodiment as illustrated in FIG. 3, the first elastic object has a first spring 341 and the second elastic object has a second spring 342, but the first and second elastic objects are not limited as such. At least one of the first and second elastic objects may have rubber, for example.

(2) In the embodiment as illustrated in FIG. 3, the gripping roller 32 has a metal core 321 and an elastic covering section 322, but the gripping roller 32 is not limited as such. The gripping roller 32 may be entirely made of metal, for example.

INDUSTRIAL APPLICABILITY

The present invention is applicable to the fields of gripping mechanisms and assembly apparatuses.

The invention claimed is:
1. A gripping mechanism comprising:
a roller;
a frame which houses the roller;
a first movable plate and a second movable plate which pinch the roller inside the frame;
a first elastic object configured to urge the first movable plate toward the roller; and
a second elastic object configured to urge the second movable plate toward the roller, wherein the gripping mechanism grips an object between the first movable plate and the roller.

2. The gripping mechanism according to claim 1, wherein the frame has an opening which receives insertion of the object, and
in a periphery of the opening, the first movable plate and the second movable plate are each pivotably supported by the frame.

3. The gripping mechanism according to claim 1, wherein the second movable plate is inclined relative to a vertical direction and holds the weight of the roller.

4. The gripping mechanism according to claim 1, wherein the first elastic object has a first spring and the second elastic object has a second spring, and
the second spring is stronger than the first spring.

5. The gripping mechanism according to claim 1, wherein the frame has a side plate, and
the side plate has a cutout portion which allows passage of the object but not passage of the roller.

6. An assembly apparatus comprising:
the gripping mechanism according to claim 1; and
a driving mechanism configured to move the gripping mechanism relative to the object.

\* \* \* \* \*